United States Patent
Tanimoto et al.

(10) Patent No.: US 6,684,693 B2
(45) Date of Patent: Feb. 3, 2004

(54) HEAT GENERATION TYPE FLOW SENSOR

(75) Inventors: Kouji Tanimoto, Tokyo (JP); Tomoya Yamakawa, Tokyo (JP); Yuji Ariyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 85 days.

(21) Appl. No.: 09/725,315

(22) Filed: Nov. 29, 2000

(65) Prior Publication Data

US 2002/0007673 A1 Jan. 24, 2002

(30) Foreign Application Priority Data

Jun. 8, 2000 (JP) ........................................ 2000-172140

(51) Int. Cl.[7] ................................................. G01F 1/68
(52) U.S. Cl. .................................................... 73/204.26
(58) Field of Search ........................ 73/204.26, 204.22, 73/204.25, 204.17

(56) References Cited

U.S. PATENT DOCUMENTS

| | | | | |
|---|---|---|---|---|
| 5,291,781 A | * | 3/1994 | Nagata et al. ............ | 73/204.26 |
| 5,386,725 A | | 2/1995 | Yamakawa et al. ....... | 73/204.21 |
| 6,134,960 A | * | 10/2000 | Yamakawa et al. ....... | 73/204.26 |

FOREIGN PATENT DOCUMENTS

| JP | 10-500490 | 1/1998 | ............ G01F/1/68 |
|---|---|---|---|
| JP | 10-311750 | 11/1998 | ............ G01F/1/68 |

* cited by examiner

Primary Examiner—Edward Lefkowitz
Assistant Examiner—Jewel V. Thompson
(74) Attorney, Agent, or Firm—Sughrue Mion, PLLC

(57) ABSTRACT

A heat generation type flow sensor of an enhanced output sensitivity which is destined for use, for example, as an air flow sensor employed in an engine control system of a motor vehicle. The heat generation type flow sensor includes a silicon substrate (20), a diaphragm (10) disposed on the silicon substrate (20) and having a cavity (11a) formed in a surface thereof, a flow rate detecting element (1) provided on the diaphragm (10) and including a heat generating resistor (2) for outputting an electric signal indicative of a heating current flowing through the heat generating resistor (2), a supporting member (13) for supporting the flow rate detecting element (1) on the diaphragm (10) in such a deposition that one surface of the diaphragm (10) is exposed to a fluid for measurement while the fluid for measurement is difficult to flow into the cavity (11a) formed in the other surface of the diaphragm (10), and a control unit for performing such control that temperature of the heat generating resistor (2) is sustained higher by a predetermined temperature than that of the fluid for measurement, wherein the heat generating resistor (2) and the diaphragm (10) are so dimensioned that ratio of a width of the heat generating resistor (2) to that of the diaphragm (10) is in a range from 0.4 to 0.6 inclusive and that ratio of a length (Yh) in a longitudinal direction of the heat generating resistor (2) to that (Yd) of the diaphragm (10) is in a range from 0.4 to 0.6 inclusive.

4 Claims, 9 Drawing Sheets

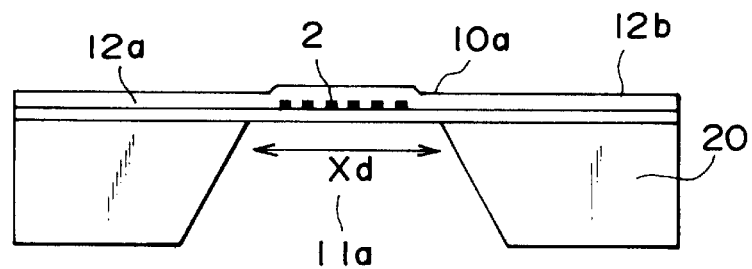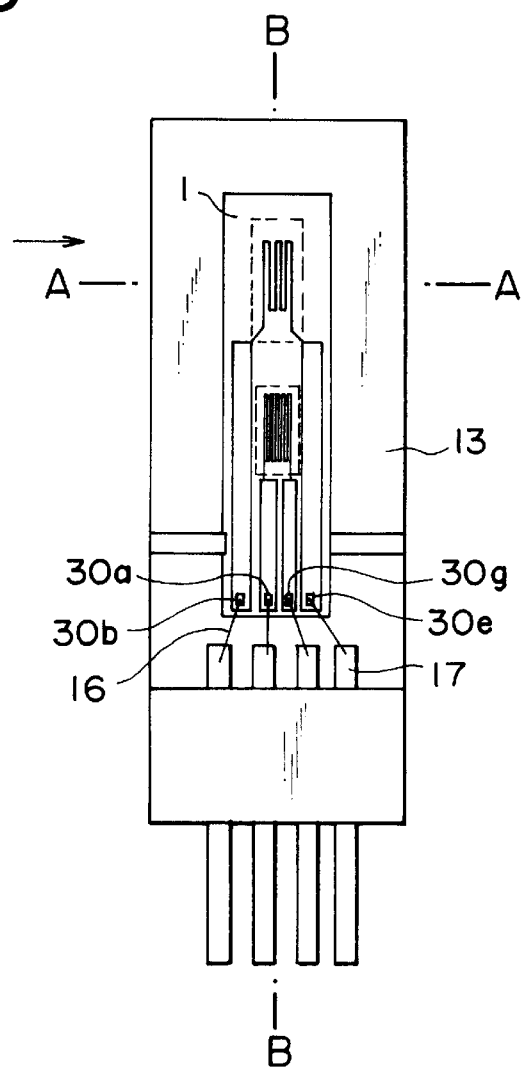

Xh/Xd

HEAT GENERATION TYPE FLOW SENSOR

BACKGROUND OF THE INVENTION

1. Field of the Invention

The present invention relates generally to a heat generation type flow sensor destined for applications where measurement of a flow rate (also referred to simply as flow) of a fluid medium such as intake air in an internal combustion engine of a motor vehicle is required for performing, for example, an air/fuel ratio control for the internal combustion engine. More particularly, the present invention is concerned with a heat generation type flow sensor which can ensure an enhanced detection sensitivity and a high reliability.

2. Description of Related Art

For better understanding of the concept underlying the present invention, description will first be made of conventional heat generation type flow sensors known heretofore by reference to the drawings. FIG. 12 shows in a top plan view a flow measuring element employed in a conventional heat generation type flow sensor, as described, for example, in Japanese PCT Application Publication No. 500490/1998, and FIG. 13 is a circuit diagram showing an equivalent circuit of a flow-rate measuring bridge circuit in which the heat generation type flow sensor is employed.

Referring to FIG. 12, the measuring element is comprised of a substrate 120, and a diaphragm 110 formed on the substrate 120. Provided on the diaphragm 110 are a heat generating resistor 112, a pair of first and second temperature detecting resistors 113 and 114, another pair of third and fourth temperature detecting resistors 115 and 116, and a connecting resistor 117 for interconnecting the third and fourth temperature detecting resistors 115 and 116. The diaphragm 110 is heated to a predetermined temperature by means of the heat generating resistor 112. Assuming that a fluid medium such as the air flows in the direction indicated by an arrow in FIG. 12, the diaphragm 110 is subjected to cooling by the flow of the fluid medium. In this conjunction, it is noted that the temperature detecting resistors 113 and 115 located upstream of the heat generating resistor 112 are cooled more intensively than the temperature detecting resistors 114 and 116 disposed downstream of the heat generating resistor 112. Thus, by detecting the difference in temperature between the upstream and downstream temperature detecting resistors, the flow rate of the fluid medium can be measured.

Next, referring to FIG. 13, description will be directed to the basic operation of the flow-rate measuring circuit in which the conventional heat generation type flow sensor is employed. As can be seen in FIG. 13, the first and second temperature detecting resistors 113 and 114 cooperate to form a first measuring bridge arm having an intermediate tap 133. On the other hand, the third and fourth temperature detecting resistors 115 and 116 and the connecting resistor 117 cooperate to form a second measuring bridge arm having two taps 134 and 135. The taps 134 and 135 are connected in series by means of adjusting resistors 145 and 146, wherein the serial circuitry is connected in parallel to the connecting resistor 117 with a tap 147 being led out from a junction between the adjusting resistors 145 and 146.

A tap 131 led out from a junction between the first temperature detecting resistor 113 and the fourth temperature detecting resistor 116 is connected to a power source (voltage source) while a tap 132 led out from a junction between the second temperature detecting resistor 114 and the third temperature detecting resistor 115 is connected to the ground. Parenthetically, the taps 131, 132, 133, 134 and 135 correspond to bonding pads of the measuring element shown in a top plan view of FIG. 14, as described later on. By adjusting resistance values of the adjusting resistors 145 and 146, the zero point of the flow-rate measuring bridge circuit can be adjusted.

In the flow sensor of the so-called temperature difference detection type structured as described above, temperature lowering at the upstream side of the heat generating resistor 112 is significant when the flow rate of the fluid medium is in a low range, presenting thus a high flow sensitivity. However, as the flow rate of the fluid medium increases, the temperature difference between the upstream side and the downstream side of the heat generating resistor 112 decreases with the flow sensitivity being correspondingly lowered. Ordinarily, no remarkable dependency is observed in the relations between the flow sensitivity on one hand and the sizes of the heat generating resistor and the diaphragm on the other hand. In general, the heat generation type flow sensor is practically so designed that the width of the strip-like heat generating resistor does not exceed one third (⅓) of the width of the diaphragm with a view to reducing the power consumption.

Furthermore, since such feedback control is ordinarily adopted that the temperature of the heat generating resistor 112 remains constant regardless of variation of the flow rate of the fluid medium, the temperature detecting resistors 113, 114, 115 and 116 tend to incur error in the detected flow rate due to a thermal lag in the response to the change or variation of the flow rate even though high responsivity of the heating current can be assured.

FIG. 14 shows in a top plan view a fluid flow measuring element 201 employed in another conventional heat generation type flow sensor described in Japanese Patent Application Laid-Open Publication No. 311750/1998 (JP-A-H10-311750). Referring to FIG. 14, the measuring element 201 is comprised of a substrate 220 and a diaphragm 210 formed on the substrate 220. Formed on the diaphragm 210 are heating conductors 202a and 202b and a temperature detecting resistor 204. Additionally, a fluid temperature detecting resistor 207 is deposited on the substrate 220. These resistance elements are connected to an external circuit 214 (see FIG. 15) by way of bonding pads 330a, 330b, 330c, 330d, 330e, 330f and 330g.

As is shown in FIG. 15, the measuring element 201 includes a supporting member 213b on which the fluid temperature detecting resistor 207 is fixedly supported so that both surfaces of the fluid temperature detecting resistor 207 are exposed directly to the air flow. Further, mounted fixedly on the supporting member 213b is the external circuit 214 which is electrically connected to the measuring element 201 by means of bonding wires 216. Besides, the external circuit 214 and the wire-bonded portion (i.e., interconnected portion of the bonding wires 216, the measuring element 201 and the external circuit 214) are covered hermetically by a cap member 213a for the purpose of protection of the wire-bonded portion.

Turning back to FIG. 14, the heating current is fed to the heat generating resistors 202a and 202b so as to keep the temperature of the temperature detecting resistor 204 higher than that of the fluid temperature detecting resistor 207 by a predetermined temperature. Thus, the flow rate of the fluid medium such as the air or the like can be detected on the basis of the heating current flowing through the heat generating resistors 202a and 202b. The heat generating resistors 202a and 202b are connected in series to each other so that the same heating current flows through both the heat generating resistors 202a and 202b. Accordingly, by comparing difference in voltage between the upstream heat generating resistor 202a and the downstream heat generating resistor 202b, the direction of the fluid or air flow can be determined.

The flow sensor of heating current detection type structured as described above can certainly exhibit an enhanced responsivity to the change of the flow rate. However, this type sensor suffers a problem that the sensitivity is low in a low range of flow rate because of nonnegligible heat losses due to heat conduction to the substrate 220 and a cavity 211 by way of the diaphragm 210 when compared with the heat loss due to the heat transfer to the fluid medium flow from the heat generating resistors 202a and 202b.

Furthermore, the measuring element 201 shown in FIG. 14 is implemented in such structure that the heat generating resistors 202a and 202b are formed on the diaphragm 210 with the temperature detecting resistor 204 being disposed between these heat generating resistors 202a and 202b, wherein no consideration is paid to the relation in size between the heat generating resistors 202a and 202b and the diaphragm. As a result of this, the loss due to heat transfer to the flow of the fluid medium remains low relative to the amount of heat generated by the heat generating resistors 202a and 202b, as a result of which the flow sensitivity is lowered, giving rise to a problem.

As is apparent from the foregoing, the heat generation type flow sensors in which the diaphragm is formed by removing partially the material of the substrate and in which the heat transfer from the heat generating resistors deposited on the diaphragm to the flow of the fluid medium such as air flow is made use of can be classified into two groups, i.e., the sensor of the temperature difference detection type designed for detecting the flow rate on the basis of the difference in temperature between the temperature detecting resistors disposed upstream and downstream of the heat generating resistor (FIGS. 12, 13) and the sensor of the heating current detection type which is designed for detecting the flow rate on the basis of the heating current flowing through the heat generating resistors (FIGS. 14, 15).

Of the flow sensors mentioned above, the temperature difference detection type flow sensor suffers a problem that temperature difference between the upstream and downstream regions becomes small in the range of high rate, which incurs lowering of the sensitivity although this type flow sensor can ensure high sensitivity in the range of low flow rate. Furthermore, because the temperature of the heat generating resistor is so controlled as to remain constant regardless of change of the flow rate through a feedback control, nonnegligible error is incurred in the flow rate detection due to lag in response of the temperature detecting resistor notwithstanding of high responsivity of the heating current, thus giving rise to a problem.

On the other hand, the flow sensor of the heating current detection type generally exhibits preferred sensitivity to the change of the flow rate. However, in the range of low flow rate, the sensitivity of this type flow sensor is low because of nonnegligible heat losses due to heat conduction to the diaphragm supporting portion and the cavity portion when compared with the quantity of heat transferred to the flow of the fluid medium from the heat generating resistors, thus rendering it difficult to detect the fluid flow behavior over a wide range with reasonable accuracy. Certainly, the sensitivity of the heating current detection type flow sensor can be enhanced by decreasing the thickness of the diaphragm. In that case, however, the mechanical strength of the diaphragm will become enfeebled, giving rise to another problem. In other words, with regard to the size of the diaphragm, the flow sensitivity and the mechanical strength are, so to say, in a trade-off relation.

SUMMARY OF THE INVENTION

In the light of the state of the art described above, it is an object of the present invention to provide a flow rate detecting element of the heating current detection type which is designed optimally by taking into consideration both factors of the mechanical strength and the sensitivity.

In view of the above and other objects which will become apparent as the description proceeds, there is provided according to a general aspect of the present invention a heat generation type flow sensor which includes a silicon substrate, a diaphragm disposed on the silicon substrate and having a cavity formed in a surface thereof, a flow rate detecting element provided on the diaphragm and including a heat generating resistor for outputting an electric signal indicative of a heating current flowing through the heat generating resistor, a supporting member for supporting the flow rate detecting element on the diaphragm in such a disposition that one surface of the diaphragm is exposed to a fluid for measurement while the fluid for measurement is difficult to flow into the cavity formed in the other surface of the diaphragm, and a control unit for performing such control that temperature of the heat generating resistor is sustained higher by a predetermined temperature than that of the fluid for measurement, wherein the heat generating resistor and the diaphragm are so dimensioned that ratio of a width of the heat generating resistor to that of the diaphragm is in a range from 0.4 to 0.6 inclusive and that ratio of a length in a longitudinal direction of the heat generating resistor to that of the diaphragm is in a range from 0.4 to 0.6 inclusive.

By virtue of the structure of the heat generation type flow sensor described above, the flow-rate sensitivity thereof can be enhanced without increasing the size of the diaphragm.

In a preferred mode for carrying out the present invention, the length in the longitudinal direction of the diaphragm may be so dimensioned as to be at least double the width of the same.

With the arrangement mentioned above, the flow sensitivity can be enhanced while ensuring a sufficient mechanical strength for the diaphragm.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 2 is a sectional view of the same taken along a line A—A shown in FIG. 1;

FIG. 3 is a top plan view showing a mounting structure of the flow rate detecting element on a supporting member according to the first embodiment of the invention;

DESCRIPTION OF THE PREFERRED EMBODIMENTS

Figure 1:
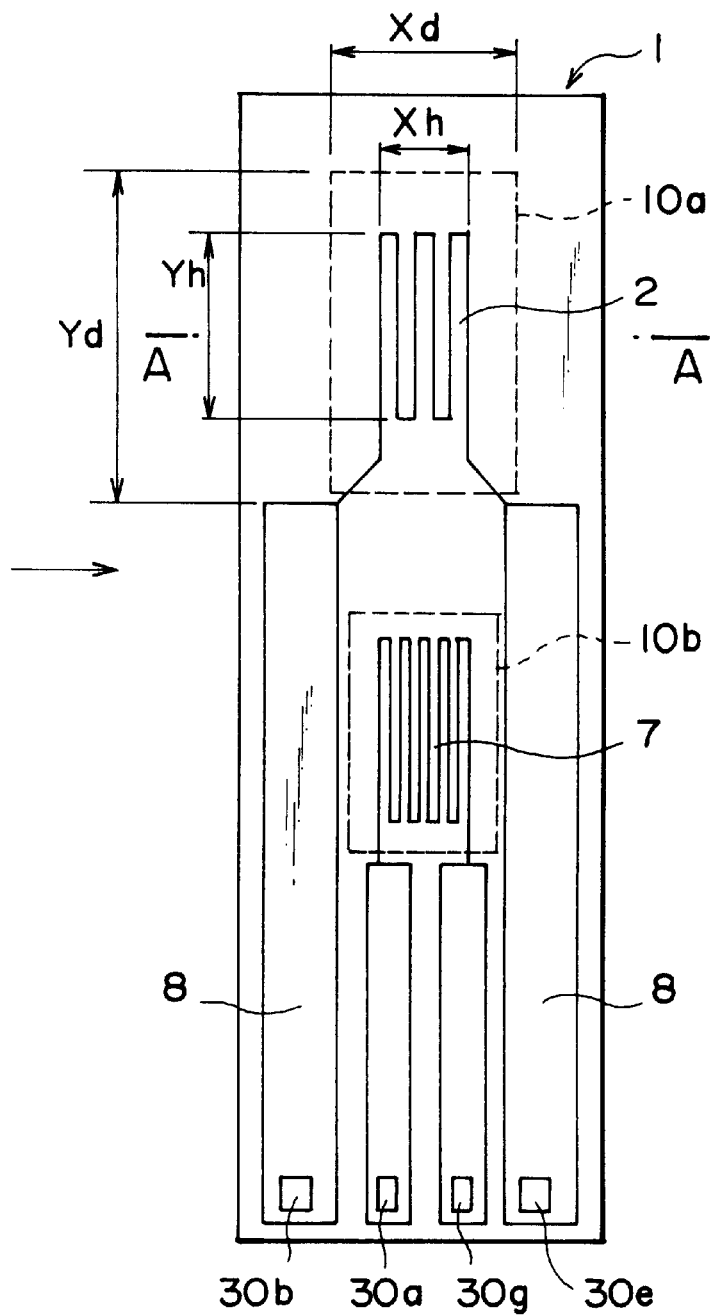
FIG. 1 is a top plan view showing a flow rate detecting element of a heat generation type flow sensor according to a first embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "top", "bottom", "front", "rear" and the like are words of convenience and are not to be construed as limiting terms.

Embodiment 1

Now, description will be made of the heat generation type flow sensor according to a first embodiment of the present invention by reference to FIG. 1.

FIG. 1 is a top plan view showing a flow rate detecting element 1 of the heat generation type flow sensor according to the first embodiment of the invention, and FIG. 2 is a sectional view of the same taken along a line A—A shown in FIG. 1. Referring to FIGS. 1 and 2, description will firstly be directed to the structure of the flow rate detecting element 1. Formed on the top surface of a silicon substrate 20 of a substantially rectangular shape are a first insulation layer 12a and a second insulation layer 12b in a laminated structure. Each of these layers 12a and 12b is formed of a dielectric film such as of silicon oxide (e.g. $SiO_2$), silicon nitride (e.g. SiN) or the like. A pair of cavities 11a and 11b are formed on the rear surface of the silicon substrate 20 with a predetermined distance therebetween in the longitudinal direction by removing partially or locally the material from the silicon substrate 20 by an etching process in such a manner that first and second diaphragms 10a and 10b formed of the first and second insulation layers 12a and 12b, respectively, are disposed at the top sides of the cavities 11a and 11b, respectively. In the region of the first diaphragm 10a, a heat generating resistor 2 formed of platinum (Pt), nickel (Ni) or the like and having resistance value which exhibits temperature dependency is disposed between the first and second insulation layers 12a and 12b. Similarly, in the region of the second diaphragm 10b, a fluid temperature detecting resistor 7 formed of the resistance film of a same material as the heat generating resistor 2 and destined for measuring the temperature of the fluid is provided between the first and second insulation layers 12a and 12b. Both ends of the heat generating resistor 2 are electrically connected to bonding pads 30a and 30g, respectively, by wiring conductors 8. Similarly, both ends of the fluid temperature detecting resistor 7 are electrically connected to bonding pads 30b and 30e, respectively.

Next, description will turn to a process of manufacturing the flow rate detecting element 1. At first, a metallic resistance film is formed on the insulation layer 12a deposited as a base layer on the silicon substrate 20 through a film deposition process such as sputtering or vapor deposition or evaporation or the like of platinum (Pt), nickel (Ni) or the like whose resistance value exhibits temperature dependency. Subsequently, the metallic resistance film is subjected to a patterning through a photomechanical process so that the metallic resistance film is imparted with a desired shape or pattern and a desired resistance value. Thereafter, the insulation layer 12b is formed as a protection film to cover wholly the insulation layer 12a inclusive of the patterned metallic resistance film. In succession, the bonding pads 30a, 30b, 30e and 30g are formed. Finally, the diaphragms 10a and 10b are formed by etching partially the silicon substrate 20 from the rear side thereof by using the insulation layer 12a as a mask so that no part of the substrate 20 can remain on the rear surface of the heat generating resistor 2 and the peripheral portion thereof.

Figure 4:
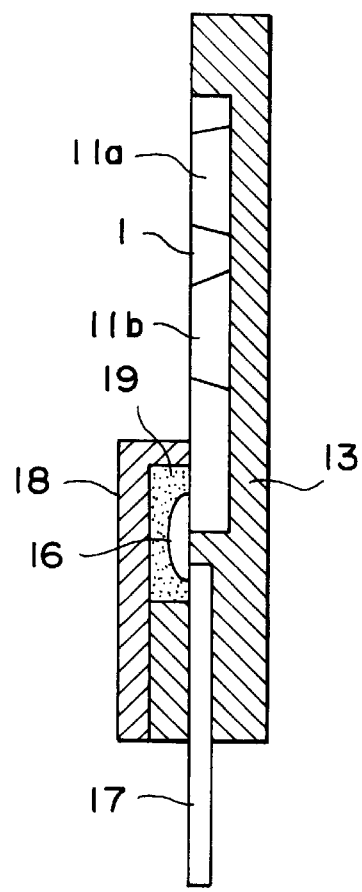
FIG. 4 is a sectional view of the same taken along a line B—B shown in FIG. 3.
Figure 5:
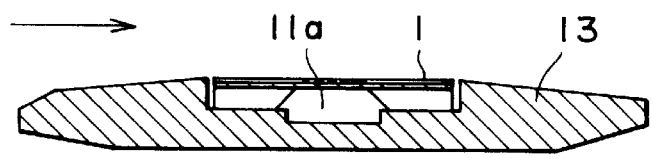
FIG. 5 is a sectional view of the same taken along a line A—A shown in FIG. 3.

FIG. 3 is a top plan view showing a mounting or packaging structure of the flow rate detecting element 1 on the supporting member 13, FIG. 4 is a sectional view of the same taken along a line B—B shown in FIG. 3, and FIG. 5 is a sectional view of the same taken along a line A—A shown in FIG. 3. As can be seen in FIG. 3, the flow rate detecting element 1 is mounted on the supporting member 13 in such disposition that the one or front surface of the diaphragm is placed directly in contact with the flow of a fluid medium for measurement and that the fluid medium is difficult to flow into a region extending adjacent to the other or rear surface of the diaphragm.

The bonding pads 30a, 30b, 30e and 30g of the flow rate detecting element 1 are electrically connected to lead frames 17 by means of bonding wires 16, respectively. The lead frames 17 in turn are connected to an external circuit (not shown). The bonding wires 16 and peripheral portion therearound are protected against external influence by means of a cap member 18, wherein the interior defined by the cap member 18 is filled with a gel 19 so that the bond is covered thereby.

As shown in FIG. 5, the supporting member 13 presents such a sectional shape which approximates a stream-line shape so that destratification does not occur in the layer of fluid flowing along the surface of the supporting member 13.

Further, the flow rate detecting element 1 is buried in the supporting member 13 so that the exposed surfaces thereof lie flush with the surfaces of the diaphragms 10a and 10b. As mentioned previously, the cavities 11a and 11b are formed in the rear surfaces of the diaphragms 10a and 10b, respectively, whereby heat insulation can be realized between the supporting member 13 on one hand and heat generating resistors 2 of the diaphragms 10a and 10b and the fluid temperature detecting resistor 7 on the other hand.

Figure 6:
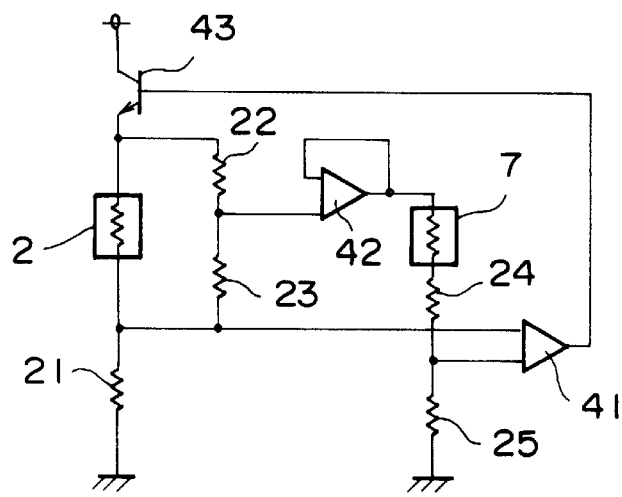
FIG. 6 is a circuit diagram showing schematically a detecting circuit for the flow rate detecting element according to the first embodiment of the invention.

The heat generating resistor 2 is constantly so controlled that the heat generating resistor 2 is always at a temperature which is higher by a predetermined temperature value than the temperature of the fluid medium or air the flow rate of which is to be measured by the fluid temperature detecting resistor 7. In other words, the heat generating resistor 2 is subjected to, so to say, a constant temperature-difference control. To this end, a driving or detecting circuit is provided. FIG. 6 is a circuit diagram showing schematically the driving or detecting circuit. Referring to FIG. 6, a bridge circuit is constituted by the heat generating resistor 2, the fluid temperature detecting resistor 7 and a plurality of fixed resistors 22 to 25, wherein these circuit components are connected with differential amplifiers 41 and 42 and a transistor 43 in a circuit configuration as shown in FIG. 6. In this bridge circuit, resistance value Rh of the heat generating resistor 2 is given by the undermentioned expressions in which the reference numerals designating the resistors shown in FIG. 6 correspond, respectively, to the scripts affixed to "R".

$$Rh = (R7 + R24)(R22 + R23)R21 / \{R23 \cdot R25 - R21(R7 + R24)\} \quad (1)$$

$$\approx (R7 + R24)(R22 + R23)R21 / (R23 \cdot R5) \quad (2)$$

When the state of the bridge circuit becomes unbalanced due to change of the temperature of the heat generating resistor 2 as brought about by variation of the flow rate of the fluid medium or air and/or change of the temperature of the fluid temperature detecting resistor 7 brought about by the change of the temperature of the air, the heating current flowing through the heat generating resistor 2 is controlled through cooperation of the differential amplifiers 41 and 42 and the transistor 43 so that the balanced state of the bridge circuit is restored. As a result of this, the heat generating resistor 2 can always assume the resistance value given by the above expressions (1) and (2), whereby the difference in temperature between the heat generating resistor 2 and the fluid temperature detecting resistor 7 is sustained to be constant.

In this state, the quantity or rate Hf of heat transfer from the heat generating resistor 2 to the air is given by the following expression:

$$Hf = h \cdot S \cdot \Delta T \quad (3)$$

where $\underline{h}$ represents a heat transfer coefficient, $\Delta T$ represents the temperature difference between the heat generating resistor 5 and the flow of the fluid medium or air, and S represents the surface area of the heat generating resistor.

On the other hand, Joule heat W generated by the heat generating resistor 2 is given by the following expression:

$$W = Rh \cdot Ih^2 \quad (4)$$

where

Rh represents the resistance value of the heat generating resistor 2, and

Ih represents the electric current flowing through the heat generating resistor 2.

In the steady state, the heat transfer rate Hf given by the expression (3) and the Joule heat W given by the expression (4) are equal to each other. Accordingly, the following expression holds true.

$$h \cdot S \cdot \Delta T = Rh \cdot Ih^2 \quad (5)$$

Hence, $$Ih = (h \cdot S \cdot \Delta T / Rh)^{1/2} \quad (6)$$

$$h = aQm^n + b$$

Since the heat transfer coefficient $\underline{h}$ can be expressed in terms of a function of mass flow rate Qm of the air, it is possible to detect the air flow rate Q by detecting the heating current Ih.

In practical applications, however, the heat quantity transferred to the flow of the fluid medium or air from the heat generating resistor 2 is a part of the Joule heat W. Besides, loss due to heat conduction from the heat generating resistor 2 to the silicon substrate 20 and the cavity 11a will take place. Thus, the actual heating current is represented by the following expression:

$$Ih = \{(Pf + Ps + Pc) / Rh\}^{1/2} \quad (7)$$

where

Ps represents the heat loss due to the heat conduction to the silicon substrate 20, and Pc represents the heat loss due to the heat conduction to the cavity 11a.

As the proportions of the heat conduction losses Ps and Pc increase as compared with the heat transfer loss Pf (=$h \cdot S \cdot \Delta T$), the flow dependency of the heating current Ih decreases with the sensitivity of the flow sensor being lowered. Accordingly, in order to improve the flow sensitivity, the size of the heat generating resistor 2 formed on the diaphragm 10a must be optimized with the ratio between the heat transfer loss Pf and the heat conduction loss (Ps+Pc) being set as large as possible.

Now, referring to FIG. 1, the width of the diaphragm 10a is represented by Xd, the length of the diaphragms 10a in the longitudinal direction orthogonal to the flow direction is represented by Yd, and the thickness of the diaphragm 10a is represented by $\underline{t}$. Stress induced in the diaphragm 10a under the action of pressure difference between the top (exposed) surface and the bottom (rear) surface thereof becomes maximum at edge portion of the diaphragm. Further, on the condition that the length Yd is at least double the width Xd and that Xd/t is constant, such characteristics make appearance that the maximum bending stress scarcely changes even when the diaphragm size changes.

Figure 7:
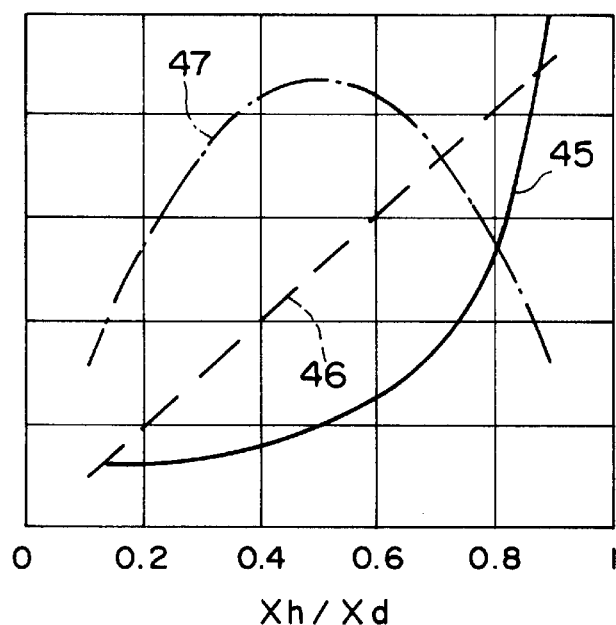
FIG. 7 is a view showing graphically a relation between heat loss from a heat generating resistor on one hand and a ratio between a width of the heat generating resistor and a width of a diaphragm on the other hand in the flow rate detecting element according to the first embodiment of the invention.

FIG. 7 is a view showing graphically and schematically relations between the heat losses from the heat generating resistor 2 on one hand and the ratio of the width Xh of the heat generating resistor 2 to the width Xd of the diaphragm 10a (Xh/Xd) on the other hand. In the figure in which the width ratio Xh/Xd is taken along the abscissa with the heat losses from the heat generating resistor 2 being taken along the ordinate, a solid line curve 45 represents the heat loss due to heat conduction from the heat generating resistor 2 to the silicon substrate 20, a broken line curve 46 represents a sum of the heat loss due to the heat transfer from the heat generating resistor 2 to the flow of the fluid medium such as air and the heat loss due to the heat conduction from the heat generating resistor 2 to the cavity 11a. Both the heat loss due to the heat transfer from the heat generating resistor 2 to the flow of the fluid medium and the heat loss due to the heat conduction to the cavity 11a from the heat generating resistor 2 increase in proportion to the increase of the area of the heat generating resistor 2, whereas the heat loss due to the heat conduction to the silicon substrate 20 from the heat generating resistor 2 increases steeply as the ratio Xh/Xd increases. Consequently, a single-dotted broken line curve 47 representing the ratio between the heat transfer loss and the heat conduction loss shows characteristically that this ratio becomes maximum at the width ratio Xh/Xd of "0.5".

Figure 8:
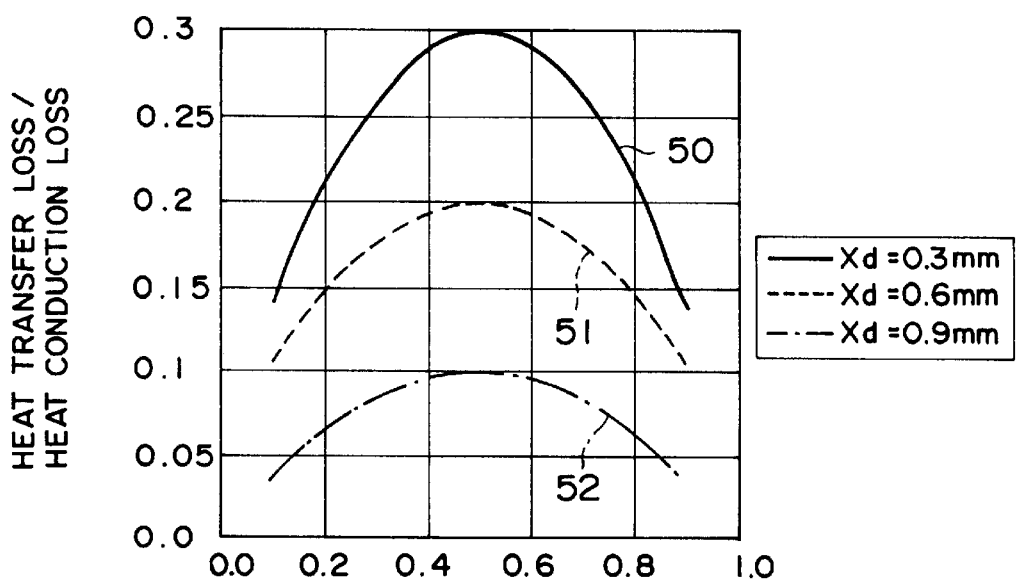
FIG. 8 is a view showing graphically a relation between a ratio between a heat transfer loss and a heat conduction loss on one hand and a ratio between width of the heat generating resistor and that of the diaphragm on the other hand in the flow rate detecting element according to the first embodiment of the invention.

FIG. 8 is a view showing schematically a relation between the ratio of the heat transfer loss to the heat conduction loss on one hand and the ratio of the width of the heat generating resistor to the width of the diaphragm (Xh/Xd) on the other hand as a function of the size of the diaphragm in a range of minimum flow rate. In the figure, a solid line curve 50 represents the ratio of the heat losses when the width of the diaphragm is 300 μmm (0.3 mm). Similarly, a broken line curve 51 represents the ratio of the heat losses in the case where the diaphragm width is 600 μmm (0.6 mm), and a single-dotted broken line curve 52 represents the ratio of the heat losses in the case where the diaphragm width is 900 μmm (0.9 mm), respectively. However, in any case, the length Yd of the diaphragm 10a is twice as long as the width Xd thereof with the ratio of the width of the diaphragm to the thickness thereof is constant at the value of "100". As will now be appreciated, the maximum sensitivity can be realized by setting the ratio of the width of the heat generating resistor to that of the diaphragm at a value falling within a range of "0.4" to "0.6" inclusive on the precondition that the mechanical strength of the diaphragm is sustained to be constant. In this conjunction, it is noted that the sensitivity can certainly be increased by increasing the size of the diaphragm. However, in that case, the responsitivity of the sensor becomes degraded more or less. Accordingly, it is important to optimize the size of the heat generating resistor while determining the size of the diaphragm so as to lie within a range allowable from the standpoint of the response characteristics of the flow rate detecting element.

Figure 9:
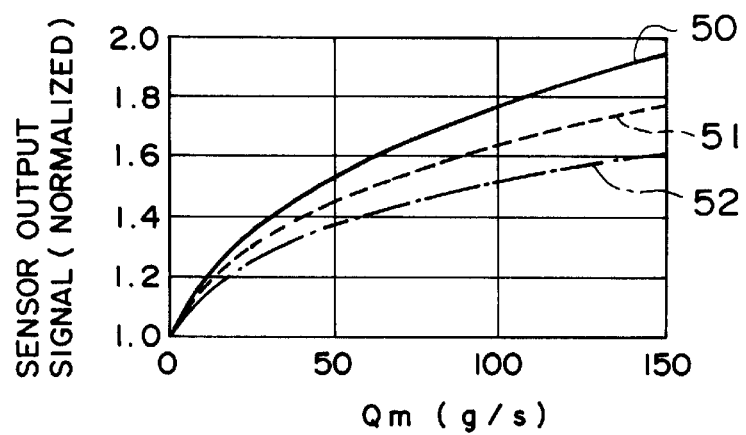
FIG. 9 is a view showing graphically characteristics of the flow rate detecting element according to the first embodiment of the invention.

FIG. 9 is a view showing graphically flow characteristics when the flow rate detecting element in which the diaphragms conforming to the characteristics curves 50, 51 and 52 and satisfying the size requirement that Xh/Xd=0.5 are employed, respectively. Parenthetically, in FIG. 9, the output signal of the flow rate detecting element taken along the ordinate is normalized on the precondition that the output for the minimum flow rate is "1". As can be seen in FIG. 9, the flow rate detecting element exhibits the flow sensitivity which increases as the ratio of the heat transfer loss to the heat conduction loss increases. At this juncture, it should also be mentioned that the relation between the ratio of the length Yh of the heat generating resistor to the length Yd of the diaphragm and the flow sensitivity exhibits the characteristic similar to the ratio of the length Yh of the heat generating resistor to the width of the diaphragm. It has experimentally been established that the maximum sensitivity can be obtained when the ratio of the length of the heat generating resistor to the length of the diaphragm falls within a range from 0.4 to 0.6 inclusive.

As will now be appreciated from the foregoing description, with the structure of the flow rate detecting element according to the first embodiment of the present invention in which the ratio of the width of the diaphragm 10a to the length thereof is selected to be at least "2" and in which the ratios of the width and the length of the heat generating resistor 2 to the width and the length of the diaphragm 10a, respectively, are selected to fall within the range of 0.4 to 0.6 inclusive, there can be realized the flow rate detecting element of the structure which is optimal in respect to both of the mechanical strength and the sensitivity.

Embodiment 2

Figure 10:
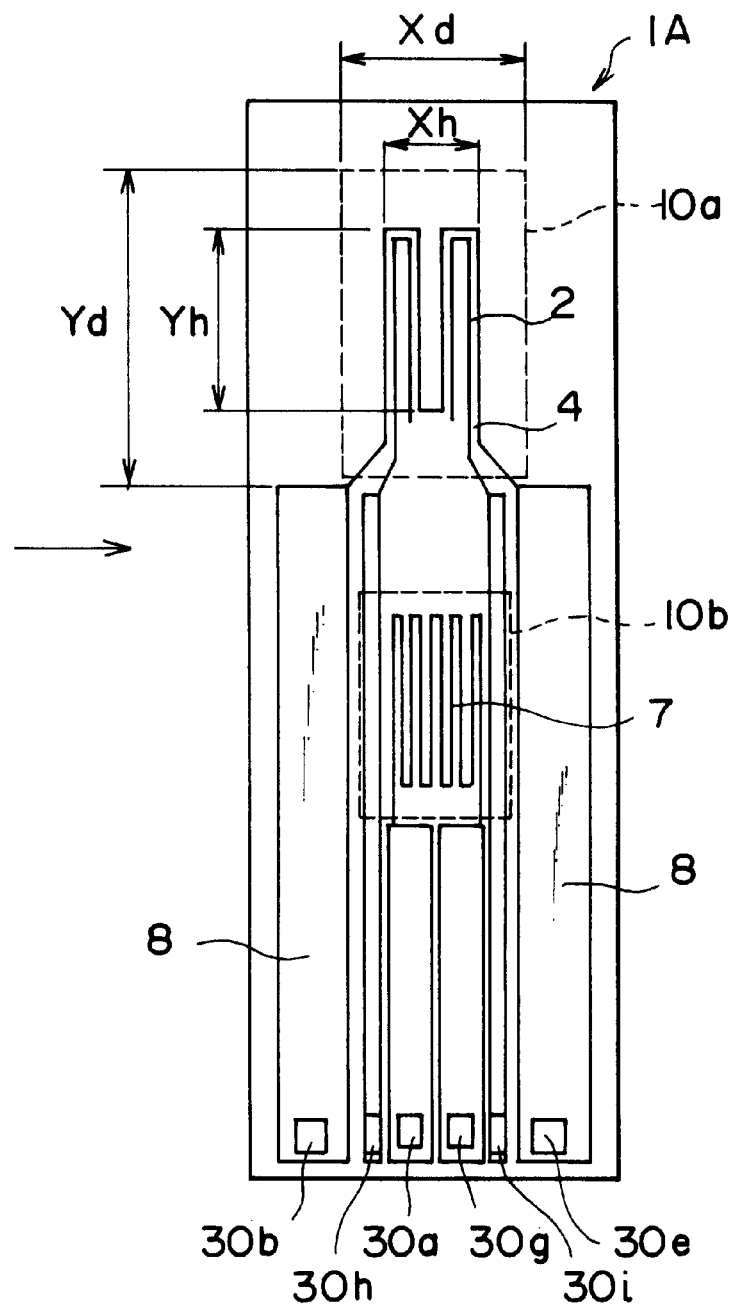
FIG. 10 is a top plan view showing a flow rate detecting element according to a second embodiment of the present invention.

FIG. 10 is a top plan view of a flow rate detecting element 1A according to a second embodiment of the present invention. As will readily be appreciated from this figure, the structure of the flow rate detecting element 1A according to the second embodiment of the invention is substantially same as that of the flow rate detecting element 1 described hereinbefore in conjunction with the first embodiment of the invention except that a generated-heat-ascribable temperature detecting resistor 4 is additionally provided for detecting a mean temperature of the heat generating resistor 2 in the flow rate detecting element denoted generally by 1A. Incidentally, in FIG. 10, items same as or equivalent to those described hereinbefore in conjunction with the first embodiment of the invention are denoted by like reference symbols.

The generated-heat-ascribable temperature detecting resistor 4 is disposed closely to the heat generating resistor 2 and patterned so that the former is substantially at a same temperature as the heat generating resistor 2 and provided between the insulation layers 12a and 12b constituting parts of the diaphragm 10a (see FIG. 2) as in the case of the heat generating resistor 2. The generated-heat-ascribable temperature detecting resistor 4 electrically connected to a driving or detecting circuit similar to that described previously by way of bonding pads 30h and 30i. The width of the heat generating resistor 2 is selected to be about a half (or 0.5) of the width of the diaphragm with the length of the heat generating resistor 2 being also selected to be about a half (0.5) of the length of the diaphragm. The method of manufacturing the flow rate detecting element 1A as well as the method of mounting or packaging the flow rate detecting element 1A is same as those described hereinbefore in conjunction with the first embodiment.

Figure 11:
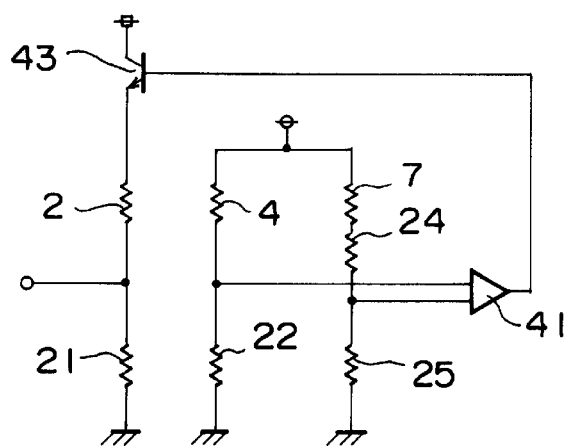
FIG. 11 is a circuit diagram showing a detecting circuit according to the second embodiment of the present invention.
Figure 12:
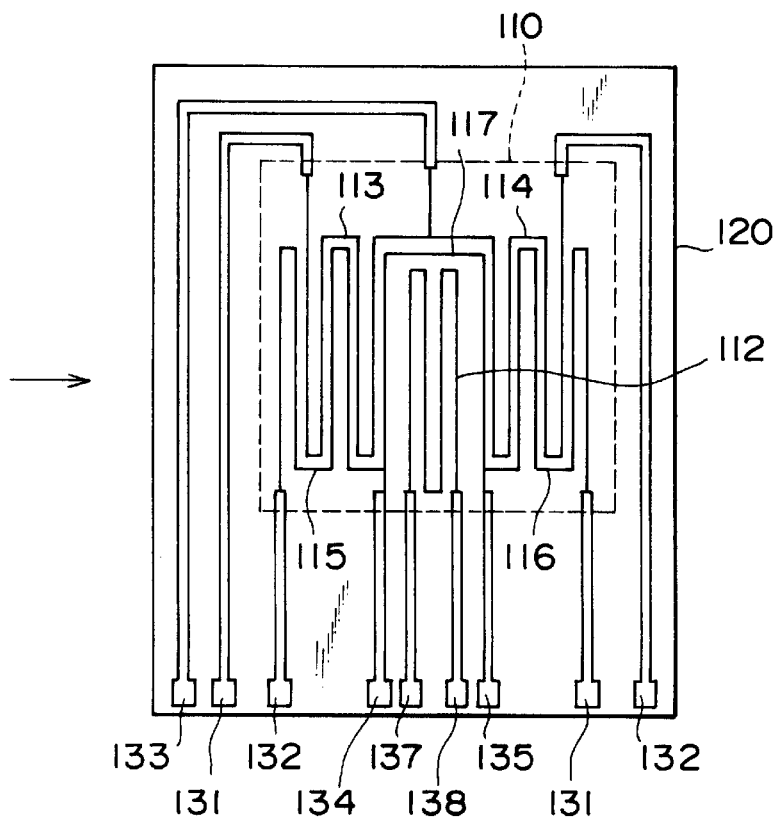
FIG. 12 is a top plan view showing a flow rate detecting element employed in a conventional heat generation type flow sensor.
Figure 13:
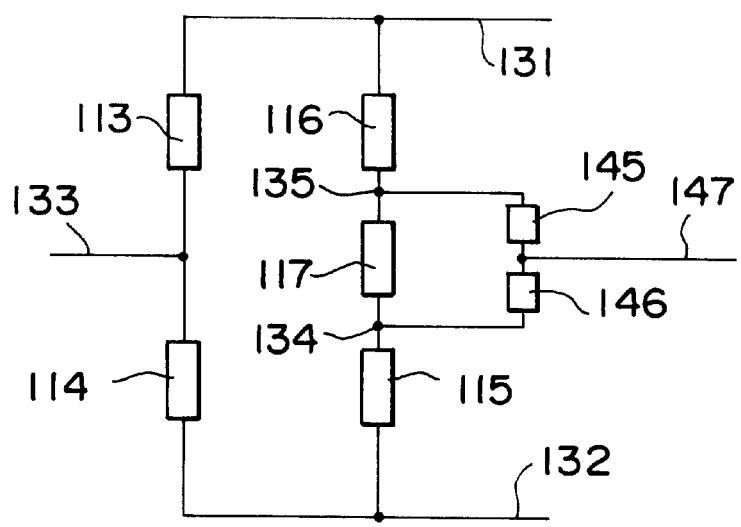
FIG. 13 is a circuit diagram showing a detection circuit of the conventional heat generation type flow sensor.
Figure 14:
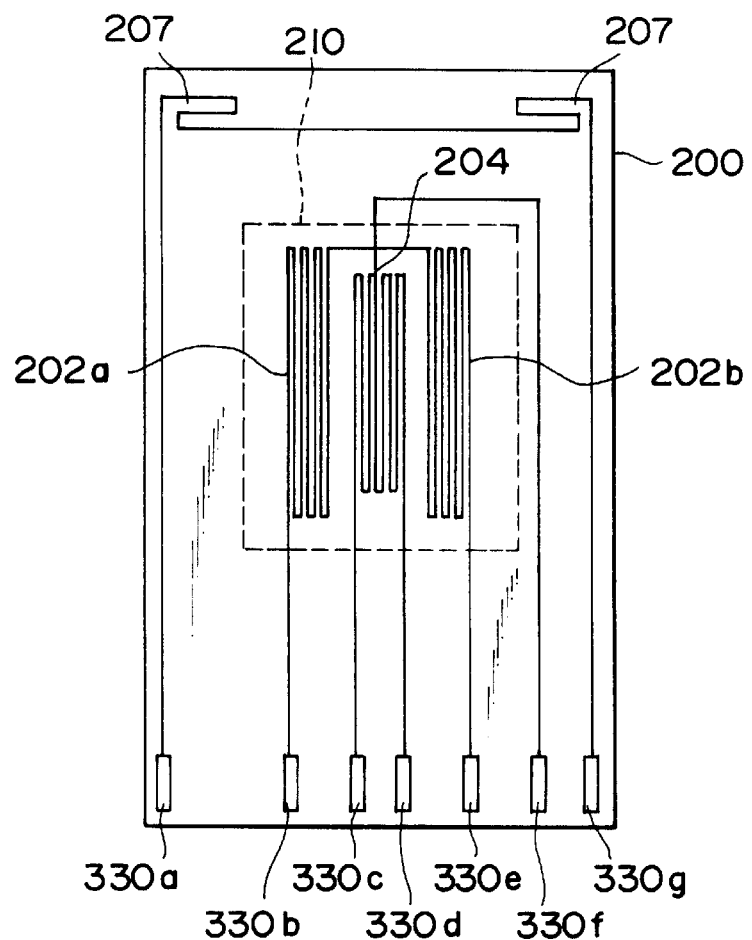
FIG. 14 is a top plan view showing a flow rate detecting element employed in another conventional heat generation type flow sensor.
Figure 15:
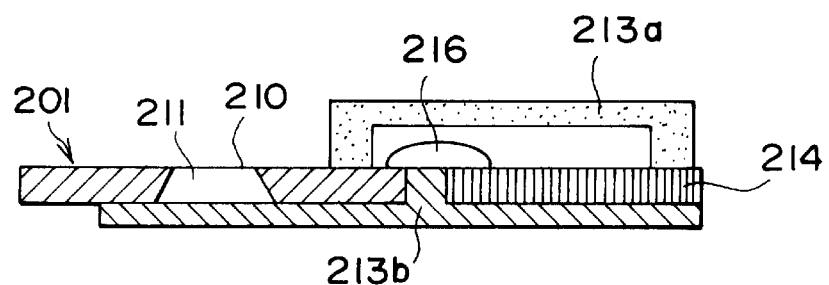
FIG. 15 is a sectional view showing a mounting structure of the flow rate detecting element of the conventional heat generation type flow sensor.

The generated-heat-ascribable temperature detecting resistor 4 is so controlled that it is always at a temperature which is higher by a predetermined value than the temperature of the fluid medium or air which is measured by the fluid temperature detecting resistor 7. In other words, the generated-heat-ascribable temperature detecting resistor 4 is subjected to a constant temperature-difference control, so to say. To this end, a driving circuit is provided. FIG. 11 is a circuit diagram showing schematically the driving circuit. Referring to FIG. 11, the driving circuit is comprised of a series connection of the fluid temperature detecting resistor 7 and the fixed resistors 24 and 25 inserted between the voltage source and the ground and a series connection of the generated-heat-ascribable temperature detecting resistor 4 and the fixed resistor 22 inserted between the voltage source and the ground, wherein a junction between the fixed resistors 24 and 25 is connected to one input terminal of a differential amplifier 41 while a junction between the generated-heat-ascribable temperature detecting resistor 4 and the fixed resistor 22 is connected to the other input terminal of the differential amplifier 41. The output terminal of the differential amplifier 41 is connected to a base electrode of a transistor 43 whose emitter is connected to the voltage source with the collector thereof being connected to the ground by way of resistors 2 and 21, wherein a tap is led out from a junction between the resistors 2 and 21. With the structure of the flow rate detecting element described above, the heating current flowing through the heat generating resistor 2 is detected in terms of a corresponding voltage making appearance across the resistor 21. In this way, the flow rate can be measured.

In the flow rate detecting element according to the instant embodiment of the invention, the relations between the sensitivity on one hand and the sizes of the diaphragm and the heat generating resistor on the other hand are utterly same as those described hereinbefore in conjunction with the first embodiment of the present invention. More specifically, by sizing the diaphragm 10 so that the ratio of the width to the length thereof is at least "2" and that ratios of the width and the length of the heat generating resistor 2 to those of the diaphragm, respectively, range from 0.4 to 0.6 inclusive, there can be implemented the structure of the flow rate detecting element which is optimal in respect to both the mechanical strength and the sensitivity.

Many modifications and variations of the present invention are possible in the light of the above techniques. It is therefore to be understood that within the scope of the appended claims, the invention may be practiced otherwise than as specifically described.

What is claimed is:

1. A heat generation type flow sensor, comprising:

a silicon substrate;

a diaphragm disposed on said silicon substrate and having a cavity formed in a surface thereof;

a flow rate detecting element provided on said diaphragm and including a heat generating resistor for outputting an electric signal indicative of a heating current flowing through said heat generating resistor;

a supporting member for supporting said flow rate detecting element on said diaphragm in such a disposition that one surface of said diaphragm is exposed to a fluid for measurement while the fluid for measurement is difficult to flow into said cavity formed in the other surface of said diaphragm; and a control unit for controlling temperature of said heat generating resistor, the temperature of said heat generating resistor being sustained higher by a predetermined temperature than that of the fluid for measurement, wherein said heat generating resistor and said diaphragm are so dimensioned that ratio of a width of said heat generating resistor to that of said diaphragm is in a range from 0.4 to 0.6 inclusive and that ratio of a length in a longitudinal direction of said heat generating resistor to that of said diaphragm is in a range from 0.4 to 0.6 inclusive.

2. A heat generation type flow sensor according to claim 1, wherein the length in the longitudinal direction of said diaphragm is at least double the width of said diaphragm.

3. A heat generation type flow sensor according to claim 1, wherein said control unit controls the temperature of said heat generating resistor to be higher than that of the fluid for measurement based on said electric signal indicative of the heating current Ih flowing through said heat generating resistor, wherein a difference of said predetermined temperature is sustained in accordance with the heating current Ih being represented by the expression:

$$Ih=((Pf+Ps+Pc)/Rh)^{1/2}$$

Pf representing heat transfer loss to the fluid for measurement, Ps representing heat loss due to conduction to said silicon substrate, Pc representing heat loss represents heat loss due to heat conduction to said cavity formed in the other surface of said diaphragm, and Rh representing a resistance value of said heat generating resistor, wherein the heat transfer loss $Pf=h \cdot S \cdot \Delta T$, h representing a heat transfer coefficient, S representing a surface area of said heat generating resistor, and $\Delta T$ representing a temperature difference between said heat generating resistor and the temperature of the fluid for measurement.

4. A heat generation type flow sensor according to claim 1, further comprising a fluid temperature detecting resistor, providing an electric signal indicative of a temperature of the fluid for measurement to said control unit.

* * * * *